Aug. 18, 1925. Re. 16,143
E. E. LINDSEY
DOUGH DEPOSITING MACHINE
Original Filed Oct. 25, 1920
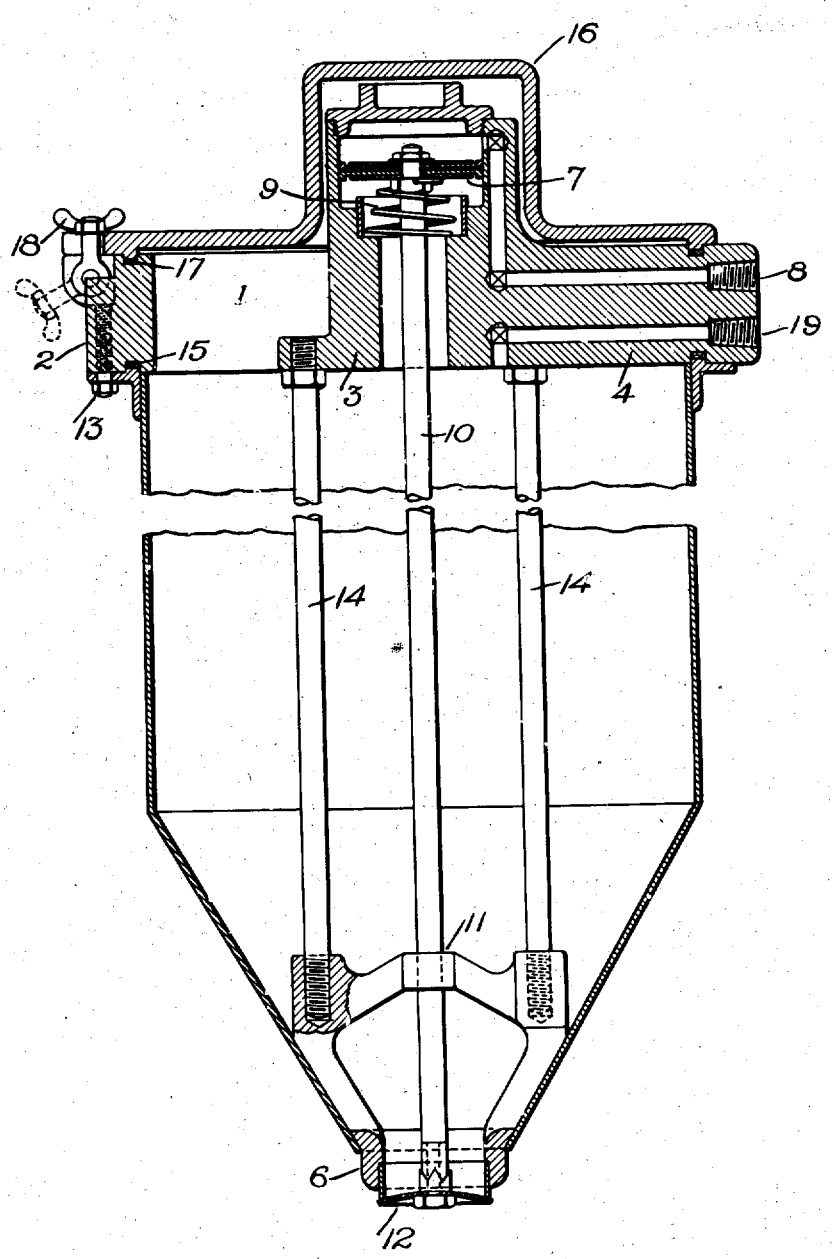
INVENTOR.
ERNEST E. LINDSEY.
BY Dewey, Strong, Townsend & Lofton
ATTORNEYS.

Reissued Aug. 18, 1925. Re. 16,143

UNITED STATES PATENT OFFICE.

ERNEST E. LINDSEY, OF SAN FRANCISCO, CALIFORNIA.

DOUGH-DEPOSITING MACHINE.

Original No. 1,381,421, dated June 14, 1921, Serial No. 419,321, filed October 25, 1920. Application for reissue filed November 29, 1922. Serial No. 604,091.

*To all whom it may concern:*

Be it known that I, ERNEST E. LINDSEY, a citizen of the United States, residing in the city and county of San Francisco, State of California, have invented a new and useful Dough-Depositing Machine, of which the following is a specification.

My invention relates to improvements in means for depositing dough, in which dough is forced by compressed air from a hopper through a die and deposited in a suitable receptacle and is particularly adapted to the manufacture of doughnuts, cookies and the like.

It is a familiar fact to bakers that working dough makes it tough, and in dough-depositing machines in which the dough is moved by a worm or a pump, the last portion of the dough is tough, and the product is misshaped.

The objects of my improvements are:

First, to provide a hopper to hold the dough.

Second, to provide means to force the dough out of the hopper through the die, without causing the dough to become tough from handling.

Third, to provide means to control and regulate the flow of the dough through the die.

Fourth, to provide a die to give the dough the shape desired.

I attain these objects by the mechanism illustrated in the accompanying drawing, in which the figure is a vertical section of the entire machine. Similar numerals refer to similar parts throughout this specification.

This dough-depositing device is supported by a suitable bracket, not shown, to which the frame 1 is securely bolted. I have chosen to make the frame 1 wheel-like in form, having a heavy rim 2 with a center hub 3, and spokes of which one 4 is enlarged to contain within it passages for air for the operation of the depositor. I have made the hopper 5 circular in form, with the lower portion funnel-shaped, terminating with a circular orifice through which protrudes the female die 6 through which the dough is expressed.

The hub 3 is used as the wall of a cylinder in which the piston 7 is driven downward by air pressure received through the channel 8 from a receiver for compressed air (not shown). When the air pressure is removed the piston is moved upward by the recoil of the spring 9. Attached to the piston 7 is the rod 10, which moves in the guide 11 and carries on its lower end the male die 12 which closes the opening of the die 6.

The hopper is bolted to the rim 2 by bolts 13 and the die 6 is positioned by the rods 14 so that an air-tight joint is secured between the hopper 5 and the die 6, the dough contained in the hopper filling the role of gasket between the metal surfaces. A gasket 15 (or in lieu thereof a machined surface) produces an air-tight joint between the hopper 5 and the rim 2. A cover 16 closes the top of the hopper with an air-tight joint 17 and is held in place by hinged bolts with wing nuts 18.

Air pressure is introduced into the hopper through the passage 19.

To use the depositor, the cover 16 is first removed by loosening the bolts 18. Dough is put in the hopper through the openings between the spokes of the frame 1. The cover 16 is then replaced and fastened by the bolts 18. Air under pressure is permitted to flow through the passage 19 and fill the upper portion of the hopper. This puts pressure on the dough sufficient to force it out through the die 6 when the closing die 12 is removed.

By means of a three way valve (not shown) air under pressure is permitted to flow through the passage 8 and the piston 7 is moved downward. This opens the die 6 by lowering the die 12 and the air pressure on the dough forces the dough out through the die 6. By cutting off the air supply through 8 and permitting the air contained in the cylinder to escape, the spring 9 is allowed to expand and drive the piston upward, forcing the die 12 back into contact with the die 6, thereby cutting off the flow of the dough. This operation is repeated at will until the hopper 5 is emptied. After the dough is placed in the hopper it receives no further kneading or stirring and the last portion is deposited in the same condition as the first portion.

By adjusting the size and shape of the die 6, the pressure of the air, and the consistency of the dough, a wide variety of products may be obtained.

It is notable that during the time that the dough remains in the hopper under the air pressure maintained within the hopper that an appreciable amount of air is injected into the dough, and on its release after being expressed through the die, the compressed air contained within the dough expands and assists the operation of the leavening agent in the dough. The dough last expressed through the die which has longest been subjected to the air pressure shows this phenomenon to a greater degree than that portion of the dough first expressed through the die. The result is that, instead of the last portion being of a closer texture and tougher consistency, as is usual in those machines in which the dough is moved by mechanical means, by the method herein described the last portion of the dough has a quality superior to the quality of the dough first expressed.

The device in its present form is for the purpose of forming doughnuts, and, in practice, the hopper is placed over a tank of frying grease so that the dough, as it leaves the die members, is deposited within the tank for frying. It will be noted that the entire operation of shaping and discharging the doughnuts from the hopper is automatic.

Having thus described my invention, what I claim and desire to secure by Letters Patent is:

1. In a dough-depositing machine, a conveniently supported hopper to contain dough, an opening in the upper portion of said hopper through which dough may be placed in said hopper, a cover to close said opening with an air-tight joint, an air inlet in the upper portion of said hopper through which air under pressure may be introduced into said hopper and therein maintain an air pressure in excess of the external atmospheric pressure, a die at the bottom of said hopper through which the dough may be expressed, a cut-off valve which in conjunction with the said die may regulate the deposition of the dough, a valve stem whereby the valve may be operated by the operating means, said operating means being at a distance above said valve, and consisting of a compressed air engine in which the piston is attached to the valve stem and is moved downward by air pressure and upward by the recoil of a spring, control being had by regulation of the air supplied to said compressed air engine.

2. In a dough-depositing machine having means for expressing dough through a die, a cut-off valve, which in conjunction with the said die, may regulate the deposition of the dough, a valve stem whereby the valve may be operated by the operating means, said operating means being at a distance above said valve and consisting of a compressed air engine in which the piston is attached to the valve stem and is moved downward by air pressure and upward by the recoil of a spring, control being had by regulation of the air supplied to said compressed air engine.

3. A dough-depositing machine comprising a hopper, means for permitting compressed air to flow into the hopper for maintaining air pressure in the hopper above the dough, male and female die members closing an orifice in the bottom of the hopper, spring means for maintaining the die members normally closed and fluid pressure actuated means for separating said die members to permit dough to be expelled through the space between the die members.

4. A dough-depositing machine comprising a hopper for the dough, means for permitting compressed air to flow into the hopper for maintaining air pressure within the hopper above the dough, male and female die members controlling a discharge orifice formed in the bottom of the hopper, one of said die members being movable in a direction away from the direction of movement of the dough, spring means for maintaining the movable die member normally closed, and fluid pressure actuated means for opening said movable die member to permit measured and shaped quantities of dough to be expelled under pressure of the air.

5. A dough-depositing machine comprising a hopper for the dough, means for permitting compressed air to flow into the hopper for maintaining air pressure in the hopper above the dough, male and female die members controlling a discharge orifice formed in the bottom of the hopper, one of said die members being movable with respect to the other to permit measured and shaped quantities of dough to be expelled through the space between the die members, spring means for normally maintaining said die members closed and air actuated means for moving the die members apart.

6. A dough depositing machine comprising a hopper, means for permitting compressed air to flow into the hopper for maintaining air pressure in the hopper above the dough, male and female die members closing an orifice in the bottom of the hopper, yieldable means for maintaining a constant pressure for holding the die members normally closed, and compressed air actuated means for separating said die members to permit dough to be expelled through the space between the die members.

ERNEST E. LINDSEY.